United States Patent [19]
Kutter

[11] Patent Number: 5,242,335
[45] Date of Patent: Sep. 7, 1993

[54] PLANETARY-GEAR TRAIN FOR HYBRID-DRIVE VEHICLES

[76] Inventor: Michael Kutter, Thiersteinerrain 145, CH-4059 Basel, Switzerland

[21] Appl. No.: 835,966
[22] PCT Filed: Jun. 10, 1991
[86] PCT No.: PCT/CH91/00128
  § 371 Date: Feb. 20, 1992
  § 102(e) Date: Feb. 20, 1992
[87] PCT Pub. No.: WO91/19637
  PCT Pub. Date: Dec. 26, 1991

[30] Foreign Application Priority Data
  Jun. 21, 1990 [CH] Switzerland ............ 2074/90-2

[51] Int. Cl.⁵ .................................. F16H 1/28
[52] U.S. Cl. .............................. 475/4; 475/3
[58] Field of Search .................... 475/3, 4, 5, ; 180/65.2, 220, 371, 372; 280/212

[56] References Cited

U.S. PATENT DOCUMENTS

| | | | |
|---|---|---|---|
| 643,595 | 2/1900 | Dyer | 475/4 X |
| 713,467 | 11/1902 | Macdonald | 475/4 |
| 2,553,465 | 5/1951 | Monge | 475/3 |

FOREIGN PATENT DOCUMENTS

| | | |
|---|---|---|
| 848016 | 7/1949 | Fed. Rep. of Germany . |
| 332571 | 5/1903 | France . |
| 7611405 | 10/1976 | Netherlands . |

*Primary Examiner*—Dirk Wright
*Attorney, Agent, or Firm*—Speckman, Pauley & Fejer

[57] ABSTRACT

A planetary-gear train for a hybrid-drive vehicle employing muscle power and an auxiliary motor, where said auxiliary motor drives a sun wheel, the crown gear is driven by muscle power, and the power take-off is provided by a planetary-gear carrier on the driven wheel of the vehicle.

8 Claims, 4 Drawing Sheets

$n_1$ = RPM OF THE CROWN GEAR = MUSCLE POWER $n_2$ = RPM OF THE ELECTRIC MOTOR = 10 x RPM OF SUN WHEEL $i_2$ = GEAR RATIO SUN WHEEL : PLANETARY-GEAR CARRIER
(CORRESPONDING TO ELECTRIC MOTOR : 10 x POWER TAKE-OFF)

$n_3$ = RPM OF PLANETARY-GEAR CARRIER = TAKE-OFF POWER $$n_3 = 3/4\, n_1 + 1/4\, n_2$$

WHERE DIAMETER OF SUN WHEEL = DIAMETER OF PLANET WHEELS

PLANETARY-GEAR TRAIN FOR HYBRID-DRIVE VEHICLES

BACKGROUND OF THE INVENTION

1. Field of the Invention

This invention relates to a planetary-gear train for a hybrid-drive vehicle driven by at least one of muscle power and an auxiliary motor.

2. Description of the Prior Art

A hybrid-drive vehicle with a planetary-gear train is taught by Dutch Patent Disclosure NL-A-7,611,405 in which the auxiliary motor drives the sun wheel and muscle power acts on the planetary-gear carrier. Power take-off is accomplished through an outer ring with inner teeth, the crown gear. Such a gear train utilizes a variable transmission ratio. Although planetary-gear trains have been known for years and the use of hybrid-drive vehicles was publicized more than ten years ago, this solution has not prevailed. Studies have shown that there are two essential reasons. In this arrangement, the pedal drive in conjunction with the planetary-gear carrier and the power take-off in conjunction with the hollow wheel with inner teeth, the crown gear, rotate in the same direction and the motor drive of the sun wheel rotates in the opposite direction. The result is that with an increased number of revolutions of the motor, the energy losses due to meshing of the gear train increase. In addition, it is relatively difficult to combine the addition of a transfer case for the muscle power with the known planetary-gear train. Accordingly, the total structure requires a relatively large space.

SUMMARY OF THE INVENTION

It is an object of this invention to provide a gear train for hybrid-drive vehicles which reduces the energy losses due to rolling, in particular, to the point of disappearing almost completely at a customary traveling speed. The losses occurring in a planetary-gear train are purely the cause of energy losses due to meshing which are transferred by meshing of the toothed wheels. As a result, the power loss is proportional to the power portion transmitted by the meshing output.

This object is attained in accordance with one embodiment of this invention by a planetary-gear train for a hybrid-drive vehicle employing a mixed drive of muscle power and an auxiliary motor, where the auxiliary motor drives the sun wheel and the muscle power acts on the crown gear, while the power take-off to the driven wheel of the hybrid-drive vehicle takes place through the planetary-gear carrier.

An essential feature of the use in accordance with this invention of a planetary-gear train in hybrid-drive vehicles assisted by muscle power is that the sun wheel, the planetary-gear carrier and the crown gear are always turning in the same direction of rotation. Consequently, the meshing output is considerably reduced in all operational states in comparison with other known uses, where two elements always rotate in opposite directions. The closer to the ideal conditions the two sources of power, muscle power and an auxiliary motor, perform, the less power is transmitted through meshing output. In the ideal case, the sun wheel, the planetary-gear carrier and the crown gear operate synchronously and the entire power can be transmitted without losses through a coupling output.

A particularly preferred embodiment of the planetary-gear train in accordance with this invention is attained where the train is disposed on a central hub with a centered flange, the sun wheel is rotatably seated on the hub while the planetary-gear carrier is fixedly bolted to the centered flange of the hub and to the vehicle wheel by a mounting ring, the crown gear is formed by a bell-shaped element rotatably seated on the hub and having inner teeth, which mesh with the planet wheels, and a chain change sprocket gear is disposed on the bell-shaped element which is in operative connection with the bell-shaped element used as the crown gear. The planetary-gear drive is preferably designed with the sun wheel and the planet wheels having the same diameter and number of teeth.

The chain change sprocket gear ahead of the planetary-gear train preferably is a commercially available chain changer. With the help of this gear, it is possible to absorb the created moment of reaction in each type of terrain. By use of commercially available chain changers, the rider instinctively adapts the gearing to the terrain or his desires and thus automatically achieves an rpm-torque ratio at the crown gear corresponding to the requirements and the moment of reaction. This drives the crown gear by selecting a low gear with low rpm on a hill or by selecting a high gear with high rpm on the level. Different gear ratios between the auxiliary motor and the drive wheel of the vehicle result from the different rpm at the outer ring.

As a result, a constant rpm change between the auxiliary motor and the power take-off is achieved as a function of the rpm of the crown gear, which is always optimally adapted to the terrain by instinctively adapted pedaling and operation of the gear shift and, thus, the preferably electric auxiliary motor can always be operated in the range of optimum efficiency.

BRIEF DESCRIPTION OF THE DRAWINGS

Further advantageous variant embodiments of this invention are explained in the following description, using the attached drawings, wherein.

DESCRIPTION OF PREFERRED EMBODIMENTS

Figure 1:
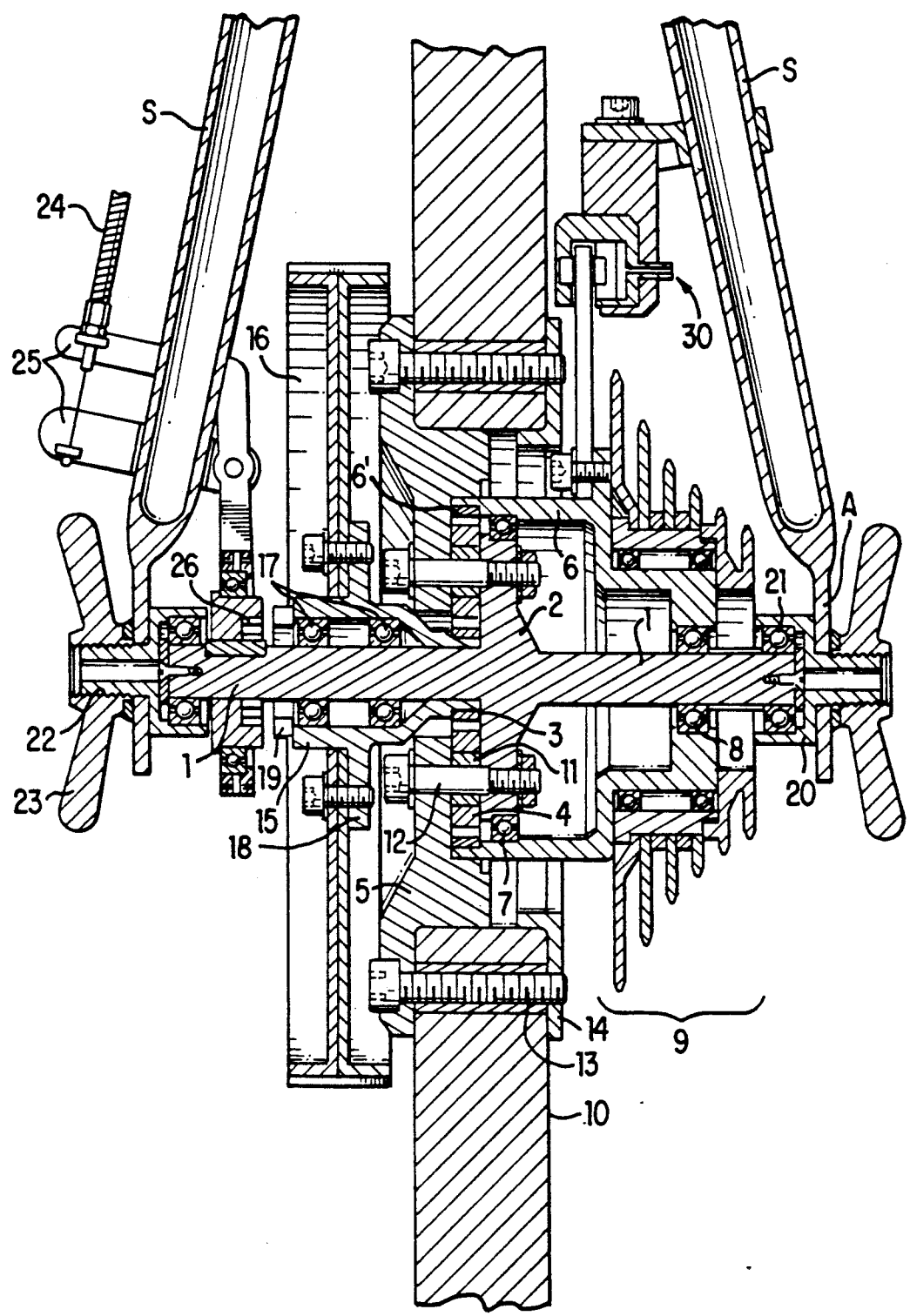
FIG. 1 is a cross-sectional diagram of the gear train in accordance with one embodiment of this invention.
Figure 7:
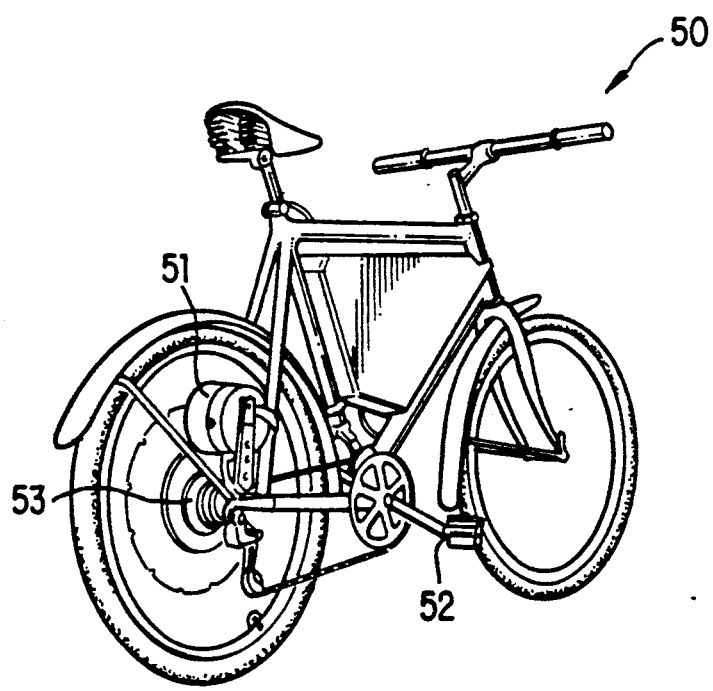
FIG. 7 is a hybrid-drive vehicle in accordance with another embodiment of this invention.

FIG. 1 shows the disposition of the gear train in accordance with one embodiment of this invention on a bicycle 50 with an auxiliary motor 51 as shown in FIG. 7. The special wheel with the gear train 53 is installed as a unit on a bicycle frame. The two rear struts S of the bicycle frame can be seen, terminating in the drop ends A. One retainer is screwed into each drop end A, in which one end of central hub 1 is directly or indirectly seated. The central hub 1 extends through the entire gear train and forms its central axis. The central hub 1, which simultaneously is the hub of the bicycle wheel, has a centered flange 2. At least on one side the centered flange 2 is reinforced in the transition area towards the central hub 1. The sun wheel 3 is rotatably seated on the central hub 1 abutting against the flat side of the centered flange 2. A plurality of planet wheels 4, at least three, are evenly distributed around the sun wheel 3. The planet wheels 4 are seated in bushes 11, which are fixedly connected on the one side with the flange centered 2 of the central hub 1 and on the other side with the planetary-gear carrier 5 by screws 12. The planetary-gear carrier 5 is a mounting ring, on which the drive wheel of the hybrid-drive vehicle, in the present case a disk wheel 10, is mounted with screws 13. Accordingly, the disk wheel 10 is clamped against the planetary-gear carrier 5 screws 13 and a counter ring 14, L-shaped in cross section.

A bell-shaped element 6 is pushed over the central hub 1 from the direction of the reinforced side of the centered flange 2, extending over the centered flange 2, and is rotatably seated thereon by a ball bearing 7 and on the central hub 1 by a ball bearing 8. On its peripheral end, the bell-shaped element 6 has inner teeth 6' which mesh with the planet wheels 4. The bell-shaped element 6, which forms the crown gear, tapers in steps from the centered flange 2 towards the outside. A plurality of gear rings 9 of a commercially available chain change sprocket gear are seated on the outer step of the bell-shaped element 6. The bell-shaped element 6, that is, the crown gear of the planetary-gear train, is driven by muscle power 52 as shown in FIG. 7 through these gear rings 9.

The sun wheel 3, which abuts against the side of the centered flange 2 facing towards the center, is seated with a force fit on a bushing 15 which is widened in steps towards the outside. In the widened area, the bushing 15 is seated on the central hub 1 with two axial bearings 17. The bushing 15, too, has an outwardly oriented flange 18 on which a toothed belt wheel 16 is screwed. This wheel is driven by an auxiliary motor through a toothed belt transmission. Usually the auxiliary motor 51 is an electric motor. This is a commercially available motor which need not be further described. The front of the bushing 15, rotatably seated on the central hub 1, is provided with axially outwardly directed teeth 19.

The central hub 1 is indirectly seated in the drop ends A of the struts S. The central hub 1 lies in the bearing bushes 20 and is supported by radial bearings 21. A centered threaded stem 22 at the bearing bush 20 is located in the drop end A of the bicycle frame thereby indirectly fixing the bearing bush 20 and, thus, the central hub 1 or the disk wheel 10 in the bicycle frame.

Figure 2:
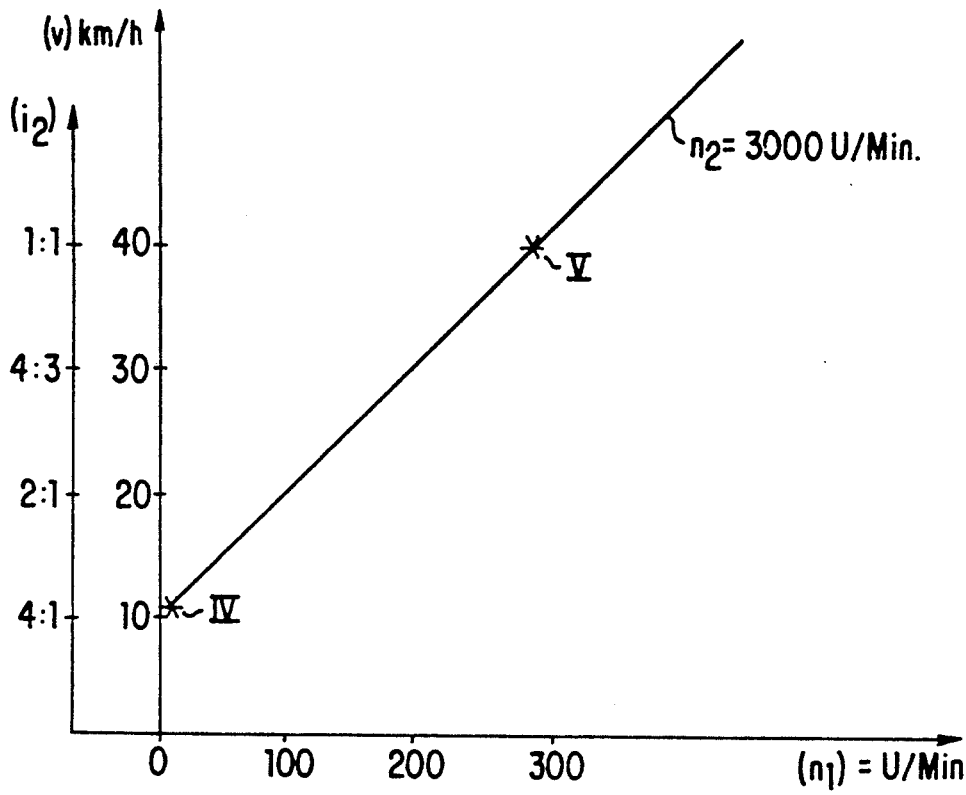
FIG. 2 is a graphic illustration of the gear ratios.

A diagram is shown in FIG. 2 which illustrates the gear ratios, assuming constant rpm of the electric motor of 3000 revolutions per minute. The varying rpm $n_1$ transmitted by muscle power 52 through the crown gear, have been entered on the ordinate, while on the abscissa, the speed in km/per hour and the gear ratio between the sun wheel and the planetary-gear carrier are entered. A gear reduction ratio of 1 to 10 exists from the toothed belt pinion of the electric motor to the toothed belt wheel 16, which is connected to the sun wheel 3. If the diameter of the sun wheel is equal to the diameter of the planet wheels, a particularly preferred embodiment, the following formula is obtained for the gear ratio:

$$n_3 = \tfrac{2}{3} n_1 + \tfrac{1}{3} n_2$$

where
- $n_1$ = the rpm of the crown gear driven by muscle power;
- $n_2$ = the rpm of the sun wheel driven by the electric motor; and
- $n_3$ = the rpm of the planetary-gear carrier, which corresponds to the rpm of the power take-off or the rpm of the bicycle wheel.

Figure 3:
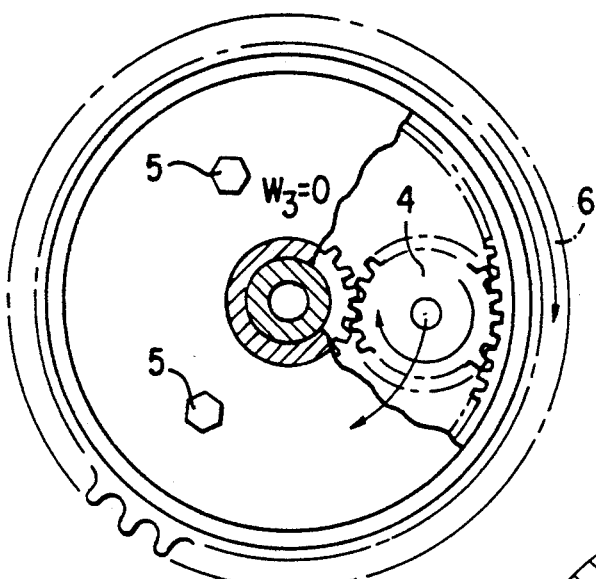
FIG. 3 is a schematic view of one shift condition of the planetary-gear train, in accordance with this invention.
Figure 4:
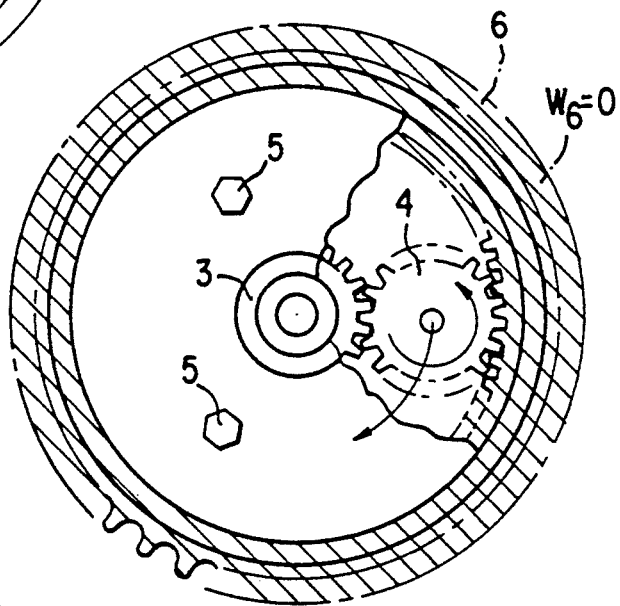
FIG. 4 is a schematic view of a second shift condition of the planetary-gear train in accordance with this invention.
Figure 5:
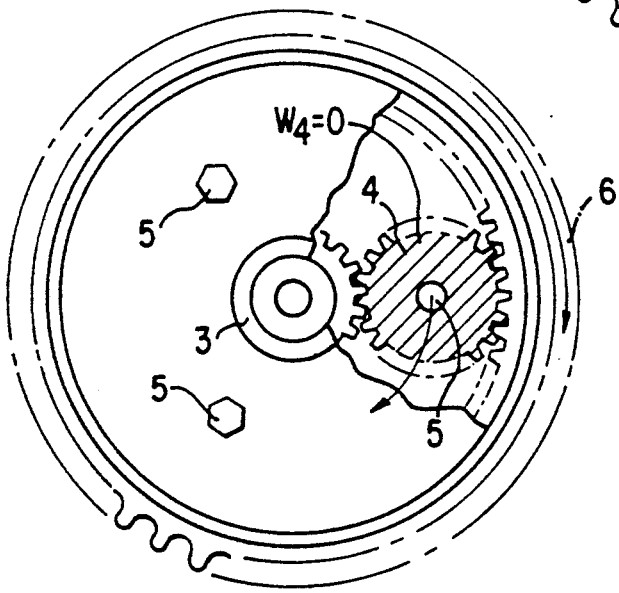
FIG. 5 is a schematic view of a third shift condition of the planetary-gear train in accordance with this invention.

Three different shift conditions of the planetary-gear train in accordance with this invention are illustrated in FIGS. 3 to 5. In FIG. 3 the condition of riding without the auxiliary motor is shown. In this case, the sun wheel 3 stands still and the crown gear, driven by muscle power 52, rotates in a clockwise direction around the sun wheel 3. The planet wheels 4 are also rotated in a clockwise direction, causing a power take-off in the planetary-gear carrier 5 also in a clockwise direction.

If the vehicle is driven by muscle power 52 alone, a slight gear reduction ratio between the pedal drive and the power take-off (4:3) occurs. This has an agreeable effect, because the rider must make a greater effort without the assistance of the motor, or must ride more slowly. If the auxiliary motor 51 again puts out more power, this effect is reduced, and thus it is possible to realize a variable rpm change of the pedal drive in a narrow, but agreeable range by controlling the auxiliary motor 51. If the rpm of the auxiliary motor 51 are controlled (by a small electronic device) as a function of the pedaling frequency, many shifting operations of the pedal drive can be omitted and a vehicle is created which is extremely easy to operate and comfortable.

The situation shown in FIG. 4 is indicated by Roman numeral IV in the diagram of FIG. 2. In this case, it is assumed that no muscle power is used, which is synonymous with halting the crown gear. Now the sun wheel 3, driven by the electric motor, rotates clockwise, while the planet wheels 4, now rolling in the crown gear, rotate counterclockwise. Finally, the planetary-drive carrier 5 rotates in a clockwise direction. This condition approximately corresponds to a steep uphill ride in which a small gear ratio of the bicycle gears (preferably chain changers) has been selected, so that the crown gear turns only very slowly.

With optimal layout of the gear train, synchronous running of the entire gear train at the most common traveling speed is attained without meshing of the planet wheels. In this case the degree of effectiveness of the gear train is 100%, that is the meshing output which must be considered as a loss is zero. This situation is shown in FIG. 5. The sun wheel 3 rotates clockwise at constant rpm determined by the electric motor, and the crown gear 6 driven by muscle power rotates in the same direction at the same rpm. As a result, the planet wheels 4 are halted. Accordingly, they do not roll or mesh at either the sun wheel 3 or the crown gear 6, and, thus, the planetary-gear carrier 5 also rotates at the same speed as the sun wheel 3 and the crown gear 6. This optimal state is attained at traveling speed and can also be fixed. For this purpose, a claw clutch 26, shown in FIG. 1, which can be operated through a Bowden cable 24 and a lever mechanism 25, is displaceably fastened on the central hub 1. In this manner, the teeth of the claw clutch 26 are brought into engagement with the axial teeth 19 of the bushing 15. A connection is thus made between the sun wheel 3 and the central hub 1 through the bushing 15 and thus with the centered flange 2, to which the planetary-gear carrier 5 is fixedly connected by the screws 12 and which, in turn, is fixedly connected to the disk wheel 10. With this forced connection, it is possible to operate in an extended range without meshing losses, that is, with a degree of effectiveness of almost 100%.

Slight, periodic rpm changes at the chain wheel occur on account of the two dead center points in the circular motion of the pedals, in particular when riding uphill. Consequently, oppositely proportional periodic changes of the rpm and power output occur at the electric motor. To stabilize the rpm and the power output of the electric motor and to assure agreeable pedaling, in accordance with one embodiment of this invention, a flywheel is attached to the shaft having the highest rpm, preferably the motor shaft. This configuration has been omitted from the drawings. It would also be possible to stabilize the periodic changes of the rpm and power output by using an electronic control at the electric motor.

In accordance with another embodiment of this invention, it is possible to realize easily controlled recovery in the case of a electric auxiliary motor. A braking device 30 for this purpose is mounted on the strut S. As a result, it is possible to brake the side of the planetary-gear train 53 operated by muscle power 52 proportionally so that the auxiliary motor 51 is brought to a multiple of the rpm of the power take-off during downhill riding and braking actions. If the diameters of the sun wheel 3 and the planet wheels 4 are the same, it is possible to achieve four times the rpm of the power take-off at the sun wheel 3. Accordingly, it is possible to accelerate the auxiliary motor past its idle speed by using the braking energy even at small riding speeds, thereby acting as a generator which supplies the batteries with the energy thus generated.

Figure 6:
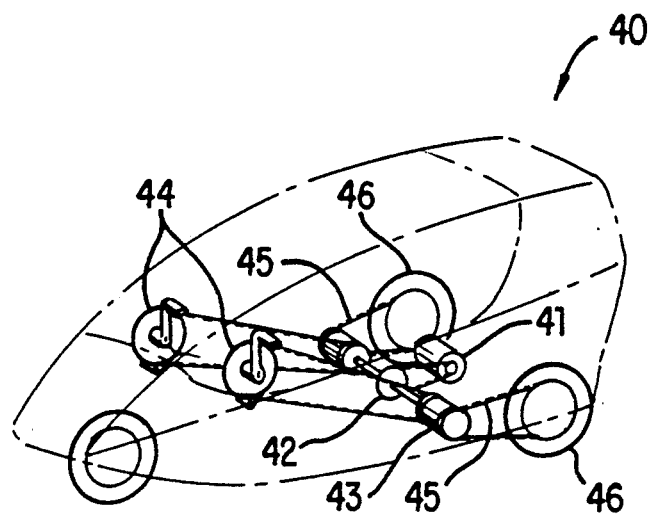
FIG. 6 is a diagram showing a four-wheel hybrid-drive vehicle in accordance with one embodiment of this invention.

The gear train in accordance with another embodiment of this invention can also be used for a four-wheeled hybrid-drive vehicle 40 shown in FIG. 6 where, for example, two persons are seated side-by-side or behind each other. Accordingly, there are two capabilities for muscle-powered propulsion 44. In this case, two planetary-gear trains 43 are mounted on one shaft or hub through which wheels 46 linked by power transmission means 45 are driven. Then the auxiliary motor 41 acts through auxiliary motor power transmission 42 on both sun wheels of both planets, which are rigidly connected to each other, one muscle-powered drive unit 44 acting on each one of the bell-shaped elements forming a crown gear. In addition, the two combined planetary-gear trains 43 act as a differential gear with an automatic lock making such a gear superfluous.

I claim:

1. In a planetary-gear train for a hybrid-drive vehicle having a mixed drive of muscle power and an auxiliary motor, the improvement comprising a sun wheel (3) driven by said auxiliary motor, a crown gear (6) driven by said muscle power, and a planetary-gear carrier (5) on the driven wheel (10) of the hybrid-drive vehicle, said planetary-gear carrier (5) providing a power take-off.

2. In a planetary-gear train in accordance with claim 1, wherein the planetary-gear train is disposed on a central hub (1) having a centered flange (2), the sun wheel (3) is rotatably seated on the central hub (1), the planetary-gear carrier (5) is fixedly connected to the centered flange (2) of the central hub (1) and bolted to a mounting ring for a vehicle wheel (10), the crown gear formed by a bell-shaped element (6) is rotatably seated on the central hub (1), said bell-shaped element having inner teeth (6'), which mesh with a plurality of planet wheels (4), and a chain change sprocket gear (9) is disposed on the bell-shaped element (6) which is in operative connection to the bell-shaped element (6).

3. In a planetary-gear train in accordance with claim 2, wherein a bushing (15) is seated on the central hub (1) which supports the sun wheel (3) abutting against the centered flange (2), said bushing (15) extending to a widened area located on the central hub (1) and having a flange (18) on which a drive wheel (16) of the auxiliary motor is fastened.

4. In a planetary-gear train in accordance with claim 3, wherein a coupling element (26) is disposed on the central hub (1), connecting the bushing (15) and the central hub (1), providing a fixed connection between the sun wheel (3) and the planetary-gear carrier (5).

5. In a planetary-gear train in accordance with claim 1, wherein the auxiliary motor is an electric motor and the crown gear (6) can be braked (30) for recovering energy.

6. In a planetary-gear train in accordance with claim 1, wherein said hybrid-drive vehicle is a four-wheeled hybrid drive vehicle having two means for muscle powered propulsion, two planetary-gear trains are mounted on a shaft and the auxiliary motor drives two sun wheels, each of the muscle-powered means acting on one crown gear and a power take-off acting on each of the driven vehicle wheels.

7. In a planetary-gear train in accordance with claim 1, wherein a flywheel is attached to the motor shaft.

8. In a planetary-gear train in accordance with claim 1, wherein the sun wheel (3) and a plurality of planet wheels (4) have the same diameter and number of teeth.

* * * * *